C. E. CARPENTER & A. J. HORTON.
CIRCUIT BREAKER.
APPLICATION FILED MAY 20, 1907.
1,089,045.
Patented Mar. 3, 1914.
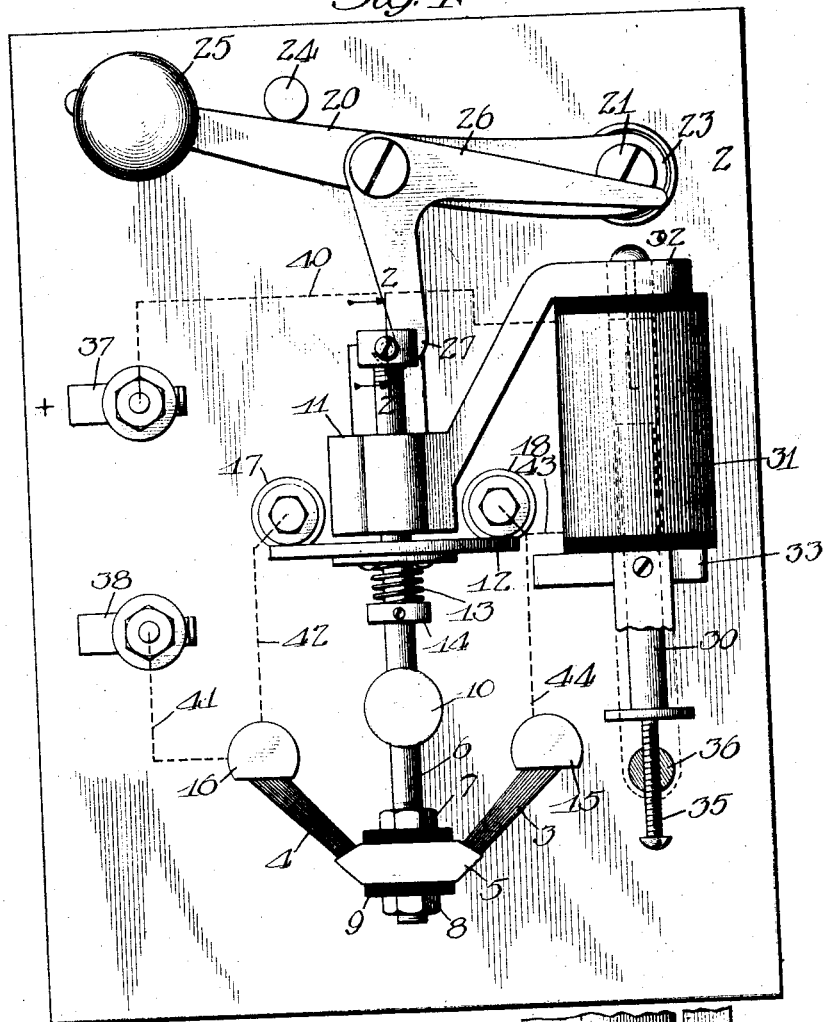
Fig. 1.
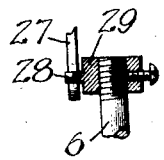
Fig. 2.
Fig. 3.
WITNESSES:
Robert H. Weir
W. Perry Hahn
INVENTORS
Charles E. Carpenter
Albert J. Horton
By: Edwin B. H. Towers
ATTORNEY

UNITED STATES PATENT OFFICE.

CHARLES E. CARPENTER, OF NEW YORK, AND ALBERT J. HORTON, OF WHITE PLAINS, NEW YORK, ASSIGNORS TO THE CUTLER-HAMMER MFG. CO., OF MILWAUKEE, WISCONSIN, A CORPORATION OF WISCONSIN.

CIRCUIT-BREAKER.

1,089,045.   Specification of Letters Patent.   Patented Mar. 3, 1914.

Application filed May 20, 1907. Serial No. 374,712.

*To all whom it may concern:*

Be it known that we, CHARLES E. CARPENTER, a citizen of the United States, residing at New York, in the county of New York and State of New York, and ALBERT J. HORTON, a citizen of the United States, and a resident of White Plains, in the county of Westchester and State of New York, have invented new and useful Improvements in Circuit-Breakers, of which the following is a full, clear, concise, and exact description, reference being had to the accompanying drawing, forming a part of this specification.

Our invention relates to improvements in circuit breakers and has for one of its objects the provision of a single operated element for setting the same, and means adapted to be operated by the electro-responsive element of the circuit breaker which shall cause said switch to open during the existence of an overload.

For the purpose of disclosing our invention, we have illustrated in the accompanying drawings, one embodiment thereof, and in said drawings: Figure 1 is an elevation showing a circuit breaker, embodying our invention, Fig. 2 is a detailed section on the line 2—2 of Fig. 1, and Fig. 3 is a detailed side elevation of a portion of the overload magnet.

In the embodiment of the invention illustrated, we provide a suitable panel or base 2 formed of slate or like material upon which the various parts of the switch are mounted. The main switch preferably comprises a pair of brushes 3 and 4, which may take the form of laminations of copper supported in a suitable cup 5, in turn carried upon the end of a rod 6, and held in position upon said rod between nuts 7 and 8. The brushes and their supporting cup are insulated from the rod by disks 9 of insulating material, interposed between the nuts 7 and 8. The rod 6 operates in a guiding stud 10, arranged near its lower end and in a guiding bracket 11, arranged near its upper end. Above the guiding stud 10 on the rod 6 is mounted an arcing contact comprising a disk 12, which rests upon a coiled spring 13 supported on the rod 6 by collar 14. The brushes 3 and 4 are arranged to make contact with contacts 15 and 16, mounted upon the base 2, and the disk 12 is arranged to engage the contacts 17 and 18. The main circuit is carried by the switch formed by the brushes 3 and 4, while the disk 12 forms an auxiliary contact arranged to open the circuit, after the brushes have disengaged, to prevent arcing at the main switch contacts.

Mounted upon the upper portion of the base or panel 2 is a lever 20 pivoted upon a suitable stud 21, having its outer end held in a raised position by a coiled spring 23. A suitable buffer 24 is provided to limit the upward movement of the lever 20 and a handle 25 is provided at its outer end for operating the lever. The lever carries a bell crank arm 26, one member of which is provided with a catch 27 arranged to engage under a projection 28 on a collar 29, secured upon the upper end of the rod 6, and thereby maintain the rod in a raised position as long as the catch is in engagement. The opposite member of the bell crank lever 26 is arranged in a line with the core 30 of an overload magnet 31, whereby when the core is raised by the magnet, it will raise the end of the arm of the bell crank lever and disconnect the catch 27, permitting the rod 6 to drop and open the circuit at the terminals 15 and 16, and 17 and 18. The pole piece 32 of the overload magnet 31 is connected with the guide bracket 11, whereby the bracket forms a polar projection between which and the pole piece 33, is arranged the contact 18 of the arcing contact member 12. By this arrangement the lines of force between the two pole pieces pass from the bracket 11 to the pole piece 33, and as the contact 12 leaves the contacts 17 and 18, any arc which may be formed between the contact 12 and the contact 18 is disrupted. The core 30 of the magnet when released thereby rests upon an adjusting screw 35 projecting through a stud 36 secured upon the face of the base 2. A scale calibrated for the several current values at which the switch is designed to trip extends from the stud 36 to the pole piece 33.

The switch is operatively connected with the line by means of binding posts 37 and 38. One terminal of the overload magnet 31 is connected by conductor 40, with the binding post 37. The binding post 38 is connected by conductor 41, with contact 16, and the contact 16 is also connected with the contact 17, by a conductor 42. The contact 18 is connected by a short conductor 43, with one terminal of the solenoid 31, and by conductor 44, with the contact 15.

In operation with the switch closed as shown, the circuit extends from the binding post 37, by conductor 40, through the overload magnet 31, and thence by conductors 43 and 44, across the switch formed by brushes 3 and 4, and by conductor 41, to the binding post 38. In event an overload occurs on the line, the magnet 31 will immediately attract its core, which will rise, and striking the end of the bell crank, will disconnect the rod 6 from the lever 20, permitting the rod to drop and the switch formed by the brushes 3 and 4, and the switch 12 will successively open, opening the circuit. As soon as an overload is passed, the arm 20 may be moved downwardly by the handle 25, and the catch 27 will automatically engage under the projection 28, when as the arm 25 is released, the coiled spring will raise the arm carrying with it the rod and closing the switch. It will be noted, however, that as long as the conditions causing an overload exist in the circuit; while the arm may be raised to close the switch, as soon as the switch is closed the coil 31 is energized and the latch disengaged to permit the switch to open. It is therefore impossible for the switch to remain closed as long as an overload exists.

Having thus described our invention what we claim as new and desire to secure by Letters Patent is:

1. In combination, a longitudinally movable rod, a laminated main switch rigidly mounted thereon, an auxiliary switch resiliently mounted on said rod and arranged to be closed before and opened after said main switch, said rod tending to stand in position to hold said switches open, means for holding said rod in position to close said switches, and an electromagnet for causing said means to release said rod upon the occurrence of abnormal electrical conditions, said magnet having pole pieces between which the arc formed upon the opening of said auxiliary switch is extinguished, one of said pole pieces forming a guide for said rod.

2. In a circuit breaker, the combination with a longitudinally movable rod, a laminated main switch rigidly mounted thereon, an auxiliary switch resiliently mounted on said rod, said rod tending to stand in position to hold said switches open, a pivoted arm, a bell crank lever pivoted on said arm and provided with a catch adapted to engage said rod, a spring tending to move said arm to actuate said rod to close said switches, an overload magnet adapted to actuate said bell crank lever to release said rod upon the occurrence of abnormal electrical conditions, said magnet having pole pieces between which the arc formed upon the opening of said auxiliary switch is extinguished, one of said pole pieces forming a guide for said rod.

In witness whereof, we have hereunto subscribed our names in the presence of two witnesses.

CHARLES E. CARPENTER.
ALBERT J. HORTON.

Witnesses:
R. H. MANSFIELD, Jr.,
A. W. BERRESFORD.